United States Patent
Sippola

(10) Patent No.: US 11,905,599 B2
(45) Date of Patent: Feb. 20, 2024

(54) METHOD AND AN ARRANGEMENT FOR MANUFACTURING A HOT DIP GALVANIZED ROLLED HIGH STRENGTH STEEL PRODUCT

(71) Applicant: PSITEC OY, Espoo (FI)

(72) Inventor: Pertti Sippola, Espoo (FI)

(73) Assignee: Psitec Oy, Espoo (FI)

( * ) Notice: Subject to any disclaimer, the term of this patent is extended or adjusted under 35 U.S.C. 154(b) by 119 days.

(21) Appl. No.: 17/247,423

(22) Filed: Dec. 10, 2020

(65) Prior Publication Data

US 2021/0095367 A1 Apr. 1, 2021

Related U.S. Application Data

(62) Division of application No. 16/191,710, filed on Nov. 15, 2018, now Pat. No. 11,208,711.

(51) Int. Cl.
| | | |
|---|---|---|
| *C23C 2/28* | (2006.01) | |
| *C23C 2/06* | (2006.01) | |
| *C23C 2/02* | (2006.01) | |
| *C23C 2/00* | (2006.01) | |

(52) U.S. Cl.
CPC .............. *C23C 2/06* (2013.01); *C23C 2/0035* (2022.08); *C23C 2/0038* (2022.08); *C23C 2/02* (2013.01); *C23C 2/026* (2022.08); *C23C 2/0222* (2022.08); *C23C 2/0224* (2022.08); *C23C 2/29* (2022.08)

(58) Field of Classification Search
CPC ................................ C23C 2/28; C23C 2/0224
See application file for complete search history.

(56) References Cited

U.S. PATENT DOCUMENTS

| | | | |
|---|---|---|---|
| 4,073,699 A | 2/1978 | Hutkin | |
| 4,436,292 A | 3/1984 | Pfannschmidt | |
| 4,759,807 A * | 7/1988 | Sippola | C23C 2/40 148/533 |

(Continued)

FOREIGN PATENT DOCUMENTS

| | | | | |
|---|---|---|---|---|
| DE | 11 2015 002 553 | | 3/2017 | |
| EP | 2559782 A1 * | | 2/2013 | B32B 15/013 |

(Continued)

OTHER PUBLICATIONS

Search Report issued in EP Appln. No. 19209074.4 dated Apr. 3, 2020.

*Primary Examiner* — David P Turocy
(74) *Attorney, Agent, or Firm* — Nixon & Vanderhye PC

(57) ABSTRACT

A method and arrangement for manufacturing hot dip galvanized rolled high strength steel product is presented. The method comprises providing a rolled steel product, heating and annealing the rolled steel product for creating a layer of iron oxide on the surface of the rolled steel product, cooling the rolled steel product, having the iron oxide layer, in a first cooling step to a temperature in a temperature range of 560-600° C. and holding for 3-10 seconds, quenching said rolled steel product, covered with the layer of iron oxide, in a second cooling step by immersing it into a zinc bath comprising aluminium and having a temperature between 440-450° C. for 1-5 seconds and cooling the rolled steel product in a third cooling step to room temperature. An arrangement for implementing the method is also presented.

19 Claims, 4 Drawing Sheets

(56) References Cited

U.S. PATENT DOCUMENTS

| | | | |
|---|---|---|---|
| 4,960,158 A * | 10/1990 | Yamada | C23C 2/40 |
| | | | 148/533 |
| 6,177,140 B1 | 1/2001 | Patil et al. | |
| 2005/0247382 A1* | 11/2005 | Sippola | C23C 2/0035 |
| | | | 148/533 |
| 2008/0308191 A1* | 12/2008 | Leuschner | C23C 2/02 |
| | | | 148/242 |
| 2009/0031950 A1 | 2/2009 | Deka et al. | |
| 2010/0304183 A1 | 12/2010 | Honda et al. | |

FOREIGN PATENT DOCUMENTS

| | | | |
|---|---|---|---|
| EP | 3 168 321 | | 5/2017 |
| EP | 3 243 924 | | 11/2017 |
| KR | 20060074364 | * | 7/2006 |
| WO | WO 2006/061151 | | 6/2006 |

\* cited by examiner

METHOD AND AN ARRANGEMENT FOR MANUFACTURING A HOT DIP GALVANIZED ROLLED HIGH STRENGTH STEEL PRODUCT

This application is a divisional of application Ser. No. 16/191,710 filed Nov. 15, 2018, the entire contents of which are hereby incorporated by reference.

FIELD OF THE INVENTION

The invention relates to a method and an arrangement for manufacturing a hot dip galvanized rolled high strength steel product.

BACKGROUND OF THE INVENTION

Hot dip galvanized high strength steel products for automotive industry, for example, are frequently manufactured from steel grades with high alloying element contents comprising Mn, Si, Cr, Mo, for example. One of the problems related to traditional processing methods and processing lines of these alloyed steel grades is the poor coating quality caused by Mn or Si oxides, for example. These oxides form on the surface of the steel during an annealing step, prior to a coating step of the rolled steel product. In addition, the traditional processing lines are not able to manufacture various steel grades in one process line without stopping the line between different steel grades.

BRIEF DESCRIPTION OF THE INVENTION

An object of the present invention is to provide a method and an arrangement for implementing the method so as to solve at least some of the above problems in order to obtain a rolled steel product with high strength and excellent properties simultaneously regarding coating and steel formability. The objects of the invention are achieved by a method and an arrangement which are characterized by what is stated in the independent claims. The preferred embodiments of the invention are disclosed in the dependent claims.

BRIEF DESCRIPTION OF THE DRAWINGS

In the following the invention will be described in greater detail by means of preferred embodiments with reference to the attached drawings, in which.

DETAILED DESCRIPTION OF THE INVENTION

A typical advanced high strength steel composition comprises 0.1-0.5 C, 0.2-5 Mn and 0.2-2 Si and optionally one or more elements form the group of Al, Mo, Cr and Ni, for example. Due to alloying elements such as Mn and Si, oxides of these elements may form on the surface of a rolled steel product during annealing. These oxides may then cause coatability issues when the same steel is product consequently coated with a zinc coating, for example.

Figure 1:
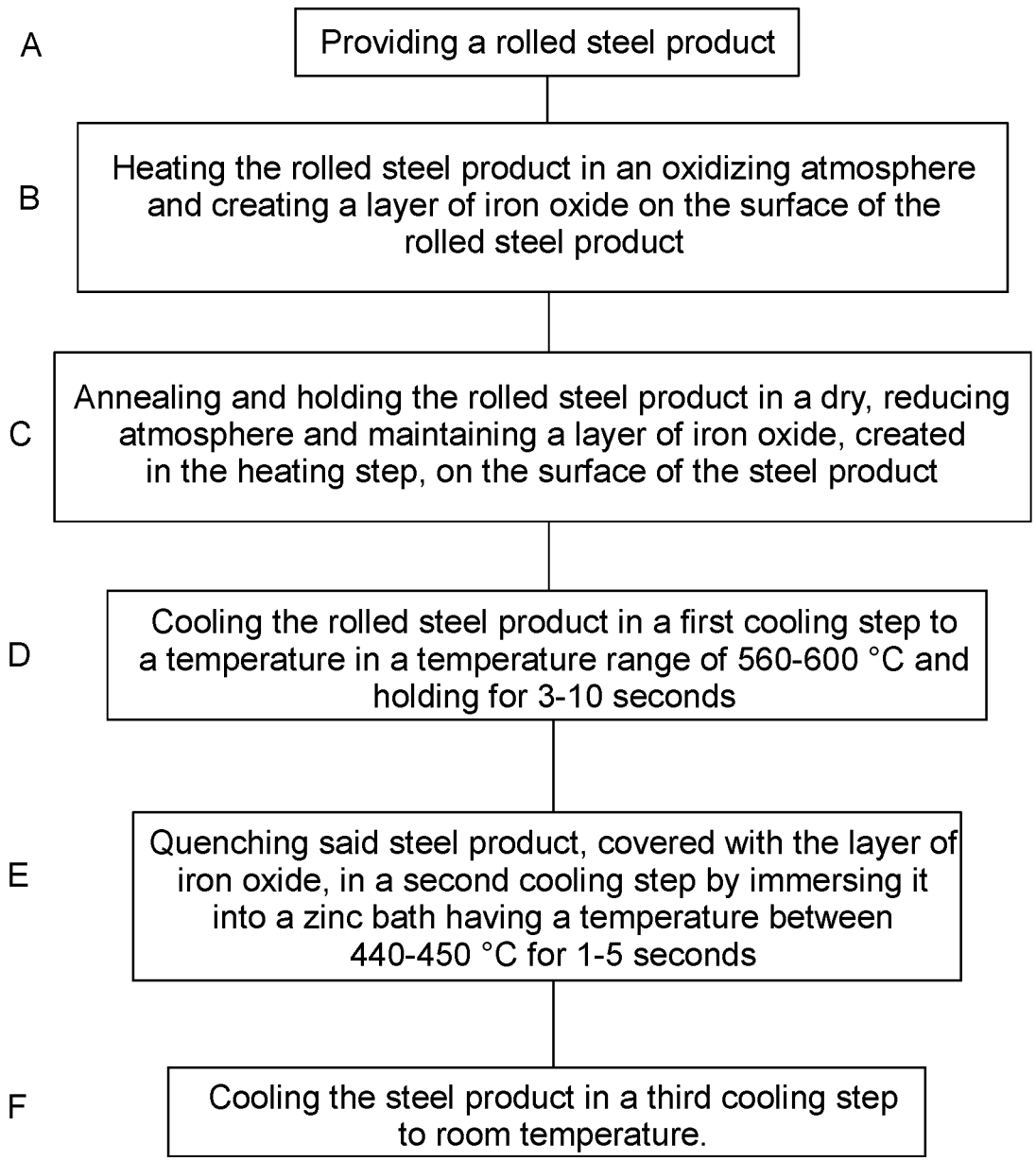
FIG. 1 is a block diagram of a method for manufacturing a hot dip galvanized rolled high strength steel product.
Figure 2:
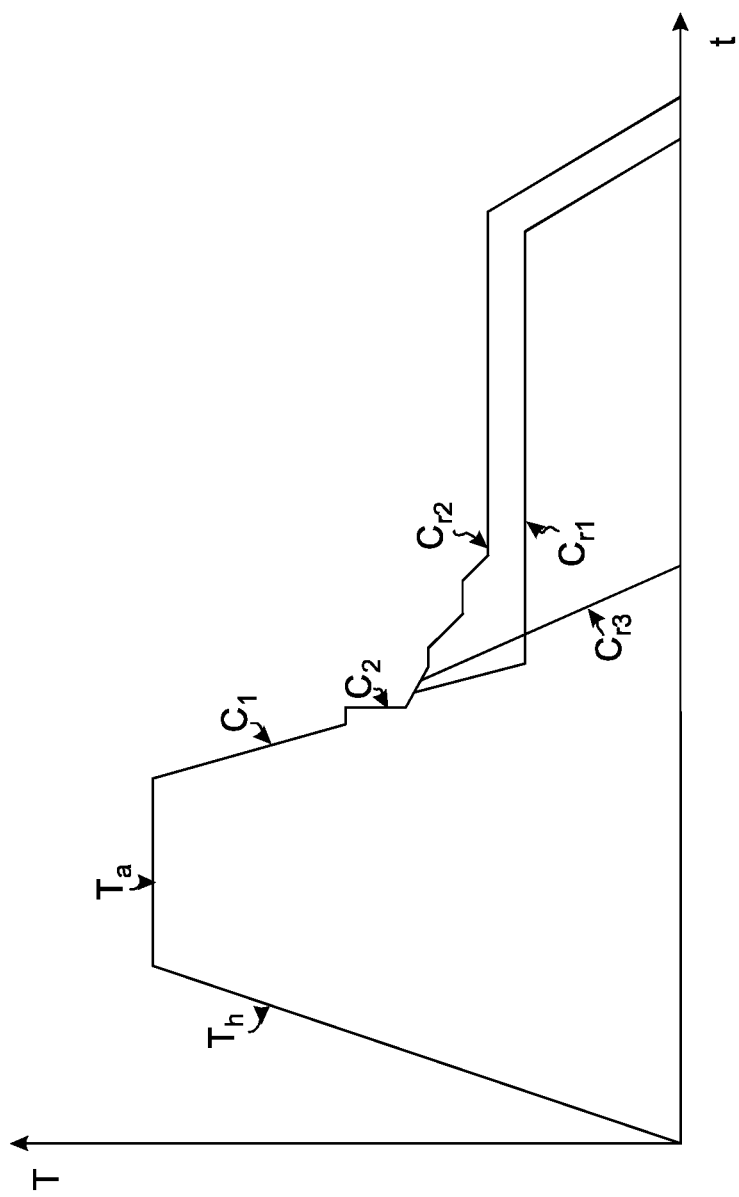
FIG. 2 is a schematic drawing of heating and cooling cycles for a rolled steel product manufactured according to the method of FIG. 1.

FIG. 1 is a block diagram of a method for manufacturing a hot dip galvanized rolled high strength steel product, which may be a sheet or a strip, for example. The rolled steel product may be a hot-rolled and pickled or a hot-rolled, pickled and cold-rolled steel product, for example. FIG. 2 is a schematic drawing showing, as an example, heating and cooling cycles for a rolled steel product manufactured according to the method of FIG. 1.

An embodiment of the method illustrated in FIG. 1 comprises steps of (A) providing a rolled steel product, (B) heating the rolled steel product first in an oxidizing atmosphere and creating a layer of iron oxide (FeO) on a surface of the rolled steel product. Advantageously, the rolled steel product is covered with an iron oxide layer from all sides after the heating step (B). The heating step (B) may be carried out in a heating temperature $T_h$ in a temperature range of 20-700° C., for example.

The heating step is followed by (C) holding i.e. annealing the rolled steel product in a dry, mildly reducing atmosphere and maintaining a layer of iron oxide, created in the heating step, on the surface of the rolled steel product. The annealing temperature Ta may be for example in the range of 700-900° C. (1292-1652 F). Depending on the final targeted microstructure, the annealing step may be carried out at a temperature at which the microstructure of the rolled steel product is ferritic, partly austenitic or fully austenitic.

The reducing atmosphere of step (C) may comprise, in vol %, 2-5% of $H_2$, preferably 2-3%, the remaining being $N_2$, for example. The atmosphere in the annealing step (C) may be mildly reducing such that not all of the iron oxide, formed in the heating step (B), is reduced to pure iron and a thin layer of iron oxide, formed during the heating step (B), is maintained on the surface of the rolled steel product after step (C). The mild reduction of iron oxide to pure iron may be controlled by controlling the amount hydrogen such that the reduction potential of the atmosphere is low.

The annealing step (C) is followed by (D) cooling the rolled steel product in a first cooling step $C_1$ to a temperature in a temperature range of 560-600° C. (1040-1112 F) and holding for 3-10 seconds and preferably to a temperature in a temperature range of 575-585° C. (1067-1085 F) and holding for 4-6 seconds, for example. This is advantageous as iron oxide is stable in temperatures above 575° C. (1067 F). At this stage, the atmosphere may be 100% $N_2$ in order to aid maintaining the iron oxide layer on the surfaces of the rolled steel product before it is immersed in a zinc bath. The cooling of the rolled steel product in the first cooling step may be accomplished using gas-jet cooling, for example. This is advantageous as gas-jet cooling suppresses Mn and Si oxidation before the zinc bath.

The first cooling step is followed by (E) quenching said steel product, covered with the layer of iron oxide, in a second cooling step $C_2$ by immersing it into the zinc bath containing aluminium and having a temperature between 440-450° C. for 1-5 seconds, the zinc bath containing aluminium and optionally also magnesium. After hot-dip zinc coating the rolled steel product according to step (E), the austenite phase of the rolled steel product, formed during the annealing step (C), is transformed into coarse carbide-free bainite and/or to an auto-tempered martensite during (F) cooling the rolled steel product in a third cooling step to room temperature.

Simultaneous rapid quenching from 580° C. (1076 F), for example, and excellent coatability with the following reduction of porous iron oxide by the aluminium of in the zinc bath allows the complete reduction of the iron oxide layer to iron to occur in the zinc bath. The iron oxide layer covers other oxides, such as Mn and Si oxides, maintained during the annealing step and thus it improves the coatability of the rolled steel product as a solid iron surface is formed.

Maintaining the layer of iron oxide on the surface of the rolled steel product when it is quenched to the zinc bath is advantageous. It is important for the good coatability of the high-alloyed steel products to have enough iron available to react with aluminium of the zinc bath for forming a uniform, proper intermetallic layer during the first meter of quenching in the zinc bath. In the present solution an advantageous portion of iron in intermetallic layer is provided by reducing the iron oxide layer to iron in the zinc bath. Furthermore, a short time in the zinc bath is advantageous, as it enables formation of lower bainite instead of upper bainite with undesirable coarse cementite carbides in the following processing steps.

The rolled steel product, manufactured according to the method of FIG. 1, may be cooled to room temperature in the third cooling step via several different cooling routes for obtaining different and desired microstructures.

In one embodiment, shown as cooling route Cri in FIG. 2, after the zinc bath and after solidification of coating formed in step (E), the rolled steel product may be first rapidly cooled to a temperature in a temperature range of 180-220° C. (356-428 F) and held for 100-300 seconds, and preferably to 195-205° C. (383-401 F) and held for 200 s, before cooling said rolled steel product to room temperature. The term rapidly cooled may in this context refer to cooling rates of 40-50° C./s, for example, but other cooling rates, such as 10-40° C./s may be implemented as well. Microstructures comprising lower bainite and auto-tempered martensite as the main phase are obtained with this heat treatment.

In another embodiment, shown as cooling route $C_{r2}$ in FIG. 2, after the zinc bath and after solidification of coating formed in step (E), the rolled steel product may be cooled to a temperature in a first temperature range of 320-400° C. (608-752 F) and held for at least 10 seconds and preferably in a temperature range of 360-400° C. (680-753 F) and held for at least for 20 seconds. This is followed by cooling the rolled steel product further to a temperature in a second temperature range of 280-320° C. (536-608 F), and finally cooling the rolled steel product to a temperature in a third temperature range of 220-280° C. (428-536 F) and holding for at least for 100 seconds and preferably at least for 200 seconds, before cooling said rolled steel product to room temperature. Microstructures comprising retained austenite, lower bainite, low-temperature bainite and auto-tempered martensite are obtained with this heat treatment.

In yet another embodiment, shown as cooling route $C_{r3}$ in FIG. 2, the rolled steel product may be continuously cooled to room temperature in the third cooling step. Microstructures comprising lower bainite and "fresh", untempered martensite are obtained with this heat treatment. The term fresh martensite in this context refers to martensite that is formed upon cooling and that is not heat treated. The precise phase fractions in each of the above embodiments obviously depend on the specific steel chemistry as well.

Figure 3:
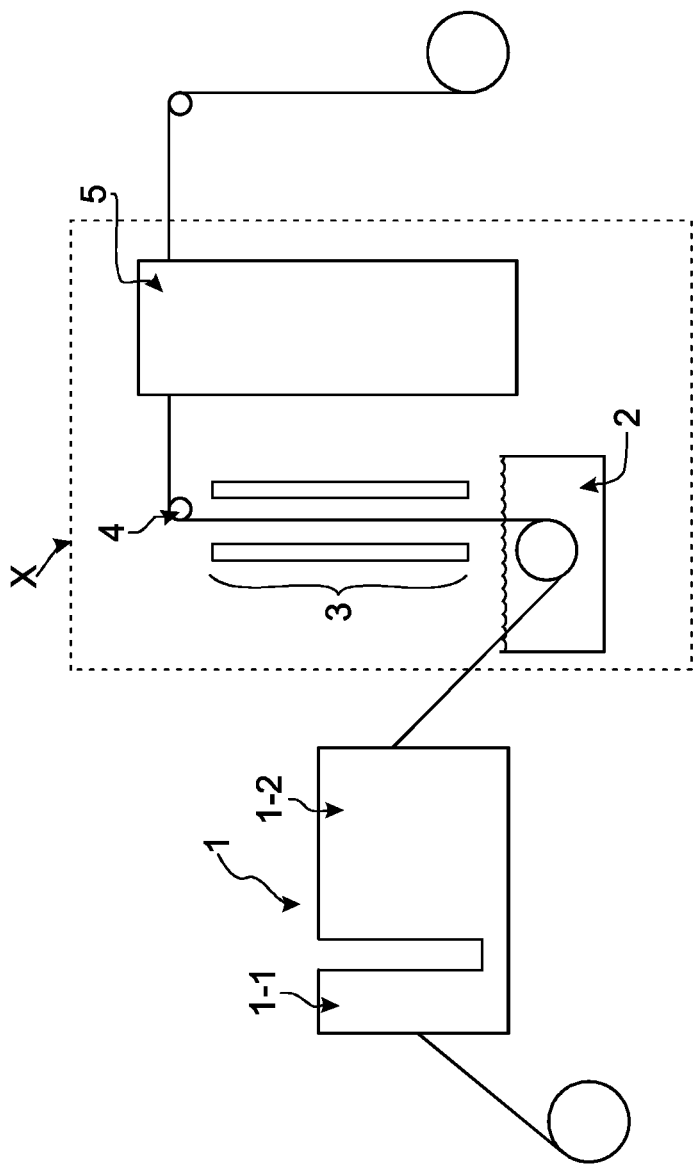
FIG. 3 is a drawing showing a general view of a rolled steel product processing line according to an embodiment.

The method for manufacturing hot dip galvanized rolled high strength steel products may be implemented with an arrangement shown in FIG. 3, which is a drawing showing a general view of a rolled steel product processing line according to an embodiment. The first furnace 1 of FIG. 3 comprises a heating section 1-1, which may optionally comprise a Direct Fired Furnace, for example, and an annealing section 1-2, which may optionally comprise a radiant tube furnace, comprising a mildly reducing atmosphere with a low dew point (less than −20° C.) resulting in low humidity.

The purpose of the first furnace 1 is to heat the rolled steel product and to create and maintain a layer of iron oxide on the surface of the rolled high strength steel product. An iron oxide layer is formed on the surface of the rolled steel product during the heating step at a temperature of approximately 700° C. in an oxidizing atmosphere.

The heating section 1-1 is followed by the annealing section 1-2 which may comprise radiant tube furnace, a soaking section and gas jet cooling section, for example. The radiant tube furnace may heat the rolled steel product up to 900° C. and the soaking is done in the soaking section preferably at least for 40 seconds. The annealing temperature may be selected such that final microstructure after the annealing step is, depending also on the chemistry of the steel, ferritic, partly austenitic or fully austenitic. The purpose of the dry, reducing atmosphere in the annealing section 1-2 following the heating section 1-1, is to maintain an iron oxide layer, produced in the heating section 1-1, on the rolled steel product.

The annealing temperature may be for example in the range of 700-900° C. (1292-1652 F). The reducing atmosphere may comprise, in vol %, 2-5% of Hz, preferably 2-3%, the remaining being Nz, for example. The dry, reducing atmosphere in the annealing section 1-2 may be mildly reducing such that not all of the iron oxide, formed in the heating section 1-1, is reduced to pure iron and a thin layer of iron oxide, formed during the heating section 1-1, is maintained on the surface of the rolled steel product after the annealing section 1-2. The mild reduction of iron oxide to pure iron may be controlled by controlling the amount hydrogen such that the reduction potential of the atmosphere is low.

After the first furnace 1, the rolled steel product is received by a zinc bath 2 containing aluminium. The zinc bath may optionally also contain magnesium. When the rolled steel product is in the zinc bath, the iron oxide layer is reduced into pure iron surface and a uniform, thin intermetallic Fe+Al layer ($Fe_2Al_5$) is formed on steel surface. The zinc bath may be similar to the one presented in U.S. Pat. No. 6,177,140 B1, for example. The coating layer may comprise zinc, aluminium and optionally also magnesium, for example.

After the zinc bath 2, the rolled steel product is received by a cooling section 3, for cooling the rolled steel product. The cooling section 3 may also comprise at least one first guiding roll 4 which receives the rolled steel product from the zinc bath 2 and guides the rolled steel product to a second furnace 5.

Figure 4A:
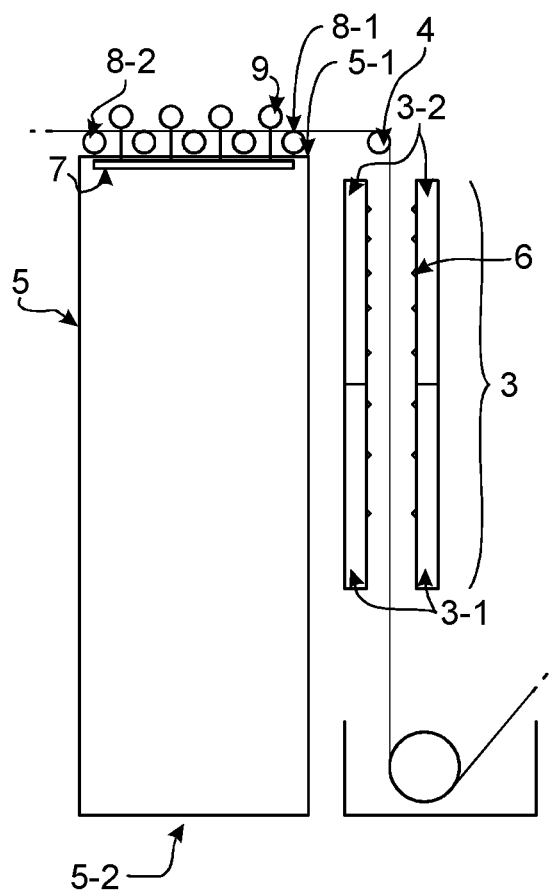
FIGS. 4a and 4b are drawings showing a second furnace with a movable platform with platform rolls in a first position and in a second position, respectively, according to the embodiment of FIG. 2.
Figure 4B:
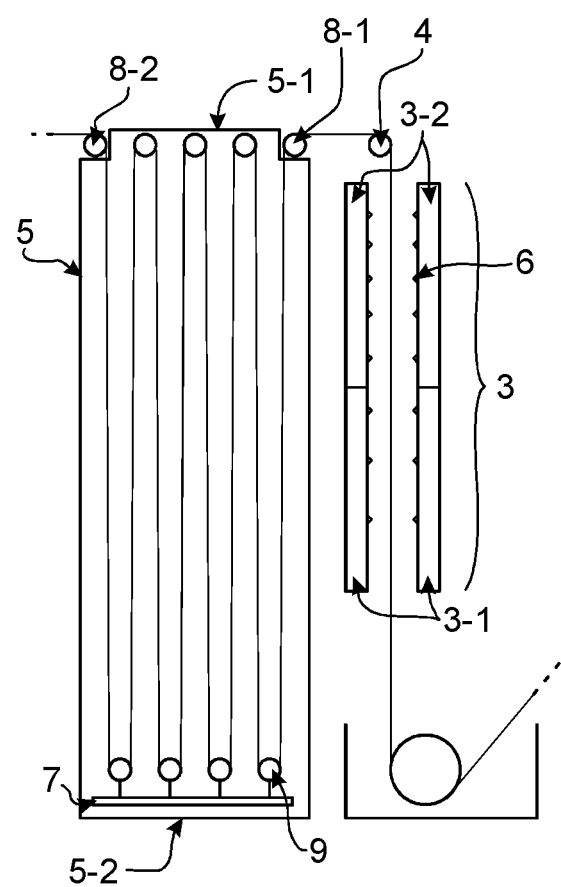

A portion of the arrangement (marked with "X" in FIG. 3) is illustrated in detail in FIGS. 4a and 4b, which are drawings showing the second furnace 5 with a movable platform 7, with platform rolls, in a first position and in a second position, respectively.

According to one embodiment, the cooling section 3 may be divided into a first cooling section 3-1 and a second cooling section 3-2. The sections may comprise a plurality of nozzles 6 for blowing air on the surface of the rolled steel product for desired cooling the rolled steel product. The cooling section may also comprise heaters which reduce the cooling rate of the rolled steel product and may also provide constant holding temperatures, if needed. It is important to note that there is no need for reheating the rolled steel product with any means and especially not with inductors.

The second furnace 5 may be arranged to receive the rolled steel product from the cooling section 3 for heat treating the rolled steel product. The heat treatment may be of isothermal hold type, for example. The second furnace 5 comprises a first end 5-1 and a second end 5-2 and the platform 7 that is arranged to move between the first end 5-1 and the second end 5-2 of the second furnace 5.

In one embodiment of the arrangement, the furnace is provided with at least a first furnace guiding roll 8-1, a second furnace guiding roll 8-2 and a first platform guiding roll 9. In another embodiment of the arrangement, the first end 5-1 of the second furnace 5 comprises more than two furnace guiding rolls, and said platform 7 of the second furnace comprises more than one platform guiding roll. For example, the number of the furnace and platform guiding rolls may be five and four, respectively, as is illustrated in the embodiment of FIGS. 4a and 4b.

In the embodiment of FIGS. 4a and 4b, the first furnace guiding roll 8-1 is arranged downstream of the first guiding roll 4, at the first end 5-1 of the second furnace 5 and the second furnace guiding roll 8-2 is provided at the first end 5-1 of the second furnace 5, away from the first furnace guiding roll 8-1. The platform rolls are arranged on to the movable platform 7. Furthermore, the first furnace guiding roll 8-1 is arranged to receive the rolled steel product from the first guiding roll 4 and the first platform guiding roll 9 is arranged to receive the rolled steel product from the first furnace roll 8-1. The second furnace guiding roll 8-2 is arranged to receive the rolled steel product from the second furnace and guide the rolled steel product into further processing steps, which may comprise a surface rolling step, a cutting step and a coiling step, for example.

The platform 7 of the second furnace 5 may be arranged to move ben tween a first position (FIG. 4a) and a second position (FIG. 4b) inside the second furnace 5. When the platform 7 is in the first position (FIG. 4a), the one or more platform guiding rolls, provided on the platform 7, move past the two or more furnace guiding rolls and the rolled steel product bypasses the second furnace 5 thus enabling a cooling route without an isothermal hold, for example.

When the platform 7 is in the second position (FIG. 4b), the rolled steel product is received by the first platform roll 9 from the first furnace roll 8-1 and is thus guided into the second furnace 5. The rolled steel product then threads on the furnace guiding rolls and platform guiding rolls, as shown in FIGS. 3a and 3b, and is held in the second furnace 5 for a given time for conducting an isothermal heat treatment, for example.

In addition, the arrangement for manufacturing a hot dip galvanized rolled steel product may comprise additional moving and guiding devices, such as guiding rolls for moving and guiding the rolled steel product from one process step to another and within the process steps.

In the embodiments of the arrangement for manufacturing a hot dip galvanized rolled high strength steel product presented here, the rolled steel product is first received by the first furnace, then the rolled steel product is received by the zinc bath from the first furnace, then the rolled steel product is received by the cooling section from the zinc bath and finally, the rolled steel product is received by the second furnace from the cooling section. In addition, the arrangement may comprise further cooling sections or furnaces with movable platforms, for example. The location of the different parts and devices of the arrangement may also vary within the scope of the solution presented here.

The method and arrangement as described above and as illustrated in FIGS. 1-3 and 4a-b have several benefits. The dry, reducing atmosphere of the furnace section of the first furnace maintains an iron oxide layer on top of the rolled steel product. The layer of iron oxide is maintained on the rolled steel product as the rolled steel product is cooled to a temperature, advantageously above 575° C., before it is quenched to a zinc bath where the iron oxide layer is reduced by the aluminium of the zinc bath to iron forming the intermetallic layer with aluminium thus covering other oxides formed during the annealing step thus improving the coatability of the rolled steel product.

In addition, as the rolled steel product is continuously cooled after the annealing step, no reheating is needed in order to obtain microstructures that comprise transformation of austenite to lower bainite and to auto-tempered martensite. Other processes for manufacturing steels for the automotive industry, such as quenching and partitioning, or Q&P, inherently involve reheating the rolled steel product in order to create microstructures comprising austenite. This increases energy consumption. In addition, some Q&P processes utilize induction heating for heating the rolled steel product to a desired temperature after an initial quench. Induction heating is problematic for austenite containing microstructures, as austenite is non-magnetic and uneven heating may occur causing distortions to the rolled steel product. This is not an issue in the present solution as no reheating, and especially no induction heating is required.

Furthermore, the movable or loop-platform with the platform furnace rolls of the second furnace enables a continuous production of rolled steel products with various microstructures without stopping the production line. With the combination of the post zinc-bath cooling section and the second furnace comprising a movable platform, various different cooling paths may be implemented resulting in different microstructures and mechanical properties.

Another advantage of the movable platform is that the guiding rolls of the second furnace may be moved outside the furnace and stopped for an easy maintenance access. The rolls may then be safely cleaned from any zinc pick-ups created by the zinc-coated rolled steel product. The clean-up may be performed between production of different steel grades (when the platform is in the first position, outside the second furnace) without stopping the production line. The movable platform also increases productivity as the need for cutting and rethreading a steel strip, for example, between a steel grade change is eliminated.

The invention claimed is:

1. A method for manufacturing hot dip galvanized rolled steel product, said method comprising:
  providing a rolled steel product;
  heating the rolled steel product in an oxidizing atmosphere and creating a layer of iron oxide on the surface of the rolled steel product, wherein the iron oxide is FeO;
  annealing and holding the rolled steel product in a dry, reducing atmosphere and maintaining a layer of iron oxide, created in the heating step, on the surface of the rolled steel product during the annealing and holding;
  cooling the rolled steel product in a first cooling step to a first temperature in a first temperature range of 560-600° C. and holding the rolled steel product at the first temperature for 3-10 seconds;
  quenching said rolled steel product, covered with the layer of iron oxide, in a second cooling step by immersing it into a zinc bath containing aluminium having a temperature between 440-450° C. for 1-5 seconds;

cooling the rolled steel product in a third cooling step to room temperature,
wherein the first, second, and third cooling steps are performed consecutively in this order,
wherein the cooled rolled steel product has lower bainite and auto-tempered martensite microstructures, and
wherein the third cooling step further comprises:
(a) cooling the rolled steel product to a second temperature in a second temperature range of 320-400° C. and holding the rolled steel product at the second temperature for at least 10 seconds,
(b) cooling the rolled steel product further to a third temperature in a third temperature range of 280-320° C., and
(c) cooling the rolled steel product further to a fourth temperature in fourth temperature range of 220-280° C. and holding the rolled steel product at the fourth temperature for at least 100 seconds, before cooling said rolled steel product to room temperature, such that the cooling in (a), (b), and (c) is performed consecutively in this order.

2. The method according to claim 1, wherein the reducing atmosphere comprises, in vol %: 2-5% $H_2$, remaining being $N_2$.

3. The method according to claim 1, wherein the rolled steel product in the first cooling step is held at the first temperature for 4-8 seconds, and wherein the first temperature range is 575-585° C.

4. The method according to claim 1, wherein following the cooling in (c), the rolled steel product is cooled to room temperature continuously.

5. The method according to claim 1, wherein the rolled steel product is a sheet or a strip.

6. The method according to claim 1, wherein the first cooling step is practiced to promote stability of the iron oxide as the iron oxide is maintained on the surface of the rolled steel product.

7. The method according to claim 6, wherein the first cooling step includes cooling from an annealing temperature to the first temperature.

8. The method according to claim 1, wherein the immersion of the rolled steel product in the second cooling step is performed to allow for complete reduction of the iron oxide to iron to occur in the zinc bath.

9. The method according to claim 1, wherein the second cooling step is controlled to permit a sufficient amount of iron to be available to react with the aluminum in the zinc bath for forming a uniform intermetallic layer during the first meter of quenching.

10. The method according to claim 1, wherein an austenite phase of the rolled steel product formed during the annealing step transforms into carbide-free lower bainite and/or to an auto-tempered martensite in the third cooling step.

11. The method according to claim 1, wherein:
the first cooling step is practiced to promote stability of the iron oxide as the iron oxide is maintained on the surface of the rolled steel product;
the immersion of the rolled steel product in the second cooling step is performed to allow for complete reduction of the iron oxide to iron to occur in the zinc bath; and
an austenite phase of the rolled steel product formed during the annealing step transforms into carbide-free lower bainite and/or to an auto-tempered martensite in the third cooling step.

12. The method according to claim 1, wherein the third cooling step consists of the cooling of (a), (b), and (c) followed by the cooling to room temperature.

13. The method according to claim 12, wherein when the rolled steel product is in the zinc bath, the layer of iron oxide is reduced to pure iron on the surface and an intermetallic layer of iron and aluminum is formed.

14. The method according to claim 13, wherein the zinc bath comprises aluminum and magnesium.

15. The method according to claim 12, wherein the cooling in the first cooling step is continuous cooling at a constant rate.

16. The method according to claim 15, wherein the lower bainite and auto-tempered martensite microstructures are formed without reheating.

17. The method according to claim 1, wherein the heating is performed in a first section of a first furnace and the annealing is performed in a second section of the first furnace, the first and second sections being different from one another.

18. The method according to claim 17, further comprising conveying the rolled steel product from the first furnace to a second furnace.

19. The method of claim 18, wherein a platform is arranged to move between a first position and a second position inside the second furnace such that in the first position, one or more platform guiding rolls, provided on the platform, move past the two or more furnace guiding rolls, wherein the platform guiding rolls are outside the second furnace while the platform stays inside the second furnace.

* * * * *